March 21, 1961 J. A. SANDGREN 2,976,058
DRAFT HITCH
Filed Nov. 16, 1959 2 Sheets-Sheet 1

INVENTOR.
JOHN A. SANDGREN
BY
Stuart R. Peterson
ATTORNEY

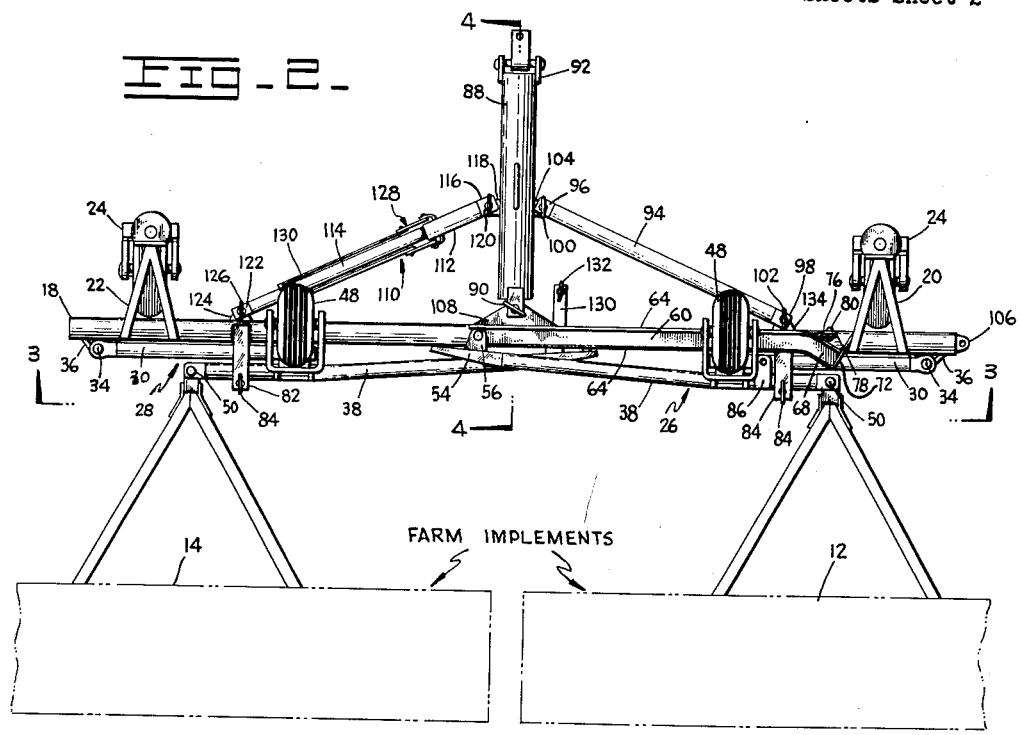

United States Patent Office 2,976,058
Patented Mar. 21, 1961

2,976,058

DRAFT HITCH

John A. Sandgren, Bathgate, N. Dak.

Filed Nov. 16, 1959, Ser. No. 853,379

11 Claims. (Cl. 280—413)

This invention relates generally to tractor hitches and pertains more particularly to a dual purpose draft hitch for towing a pair of farm implements in either an abreast or tandem relation.

Modern day farming has led to the cultivation of larger and larger areas. As can well be understood, the more ground that can be covered in a given time, whether it be in planting or cultivating, the more economical a farm operation can become. Therefore, it has become quite common to pull a couple of farm implements, such as a pair of grain drills or cultivators, behind a single tractor. Certain difficulties, however, have attended such an operation, especially where the implements must be towed along a roadway of limited width or through a gate opening which will not permit the implements to pass when they are in an abreast or field relationship with each other. Consequently, various schemes have been devised in the construction of hitches designed to pull a pair of farm implements in either an abreast or tandem position. Some of these hitches are quite complicated and costly to manufacture, whereas still others involve a considerable expenditure of time and effort in switching from one position to the other.

Accordingly, the present invention has for an object the elimination of the hard and tedious work usually associated with the problem of dual implement transportation.

Another object is to provide a draft hitch requiring only draw-bar power to prepare the implements for transport. In this regard it is planned that no hydraulic cylinders, winches, cables or tools of any sort be required.

A further object of the invention is to provide a draft hitch that can be manufactured at a relatively low cost and which will be of lightweight construction.

Another object of the invention is to provide a hitch of the envisaged character which in no way impairs the operator's vision of the implements. With a hitch constructed in accordance with the instant invention the operator has at all times an unrestricted view of the implements and the manner in which they are functioning.

A still further object is to provide a dual purpose hitch that will permit the implements to operate in their normal manner and which will not impose any extra stress or strain thereon.

Still another object of the invention is to provide a hitch unit that is adjustable to accept implements varying from, say, ten to fourteen and one-half feet in width. Thus, the hitch unit is quite versatile in its use.

Yet another object of the invention is to provide a dual purpose hitch that can be quickly manipulated from one condition to the other. It might be pointed out at this time that it takes only a few minutes for one man to prepare the hitch for field operation or for transport operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 2 is a plan view illustrating the hitch rearranged for abreast or field operation;

Figure 3 is a sectional view looking forward, the view being taken in the direction of lines 3—3 of Figure 2 but showing the left auxiliary wheel in a lowered or ground engaging position, and Figure 4 is a sectional view taken in the direction of line 4—4 of Figure 2.

Figure 1:
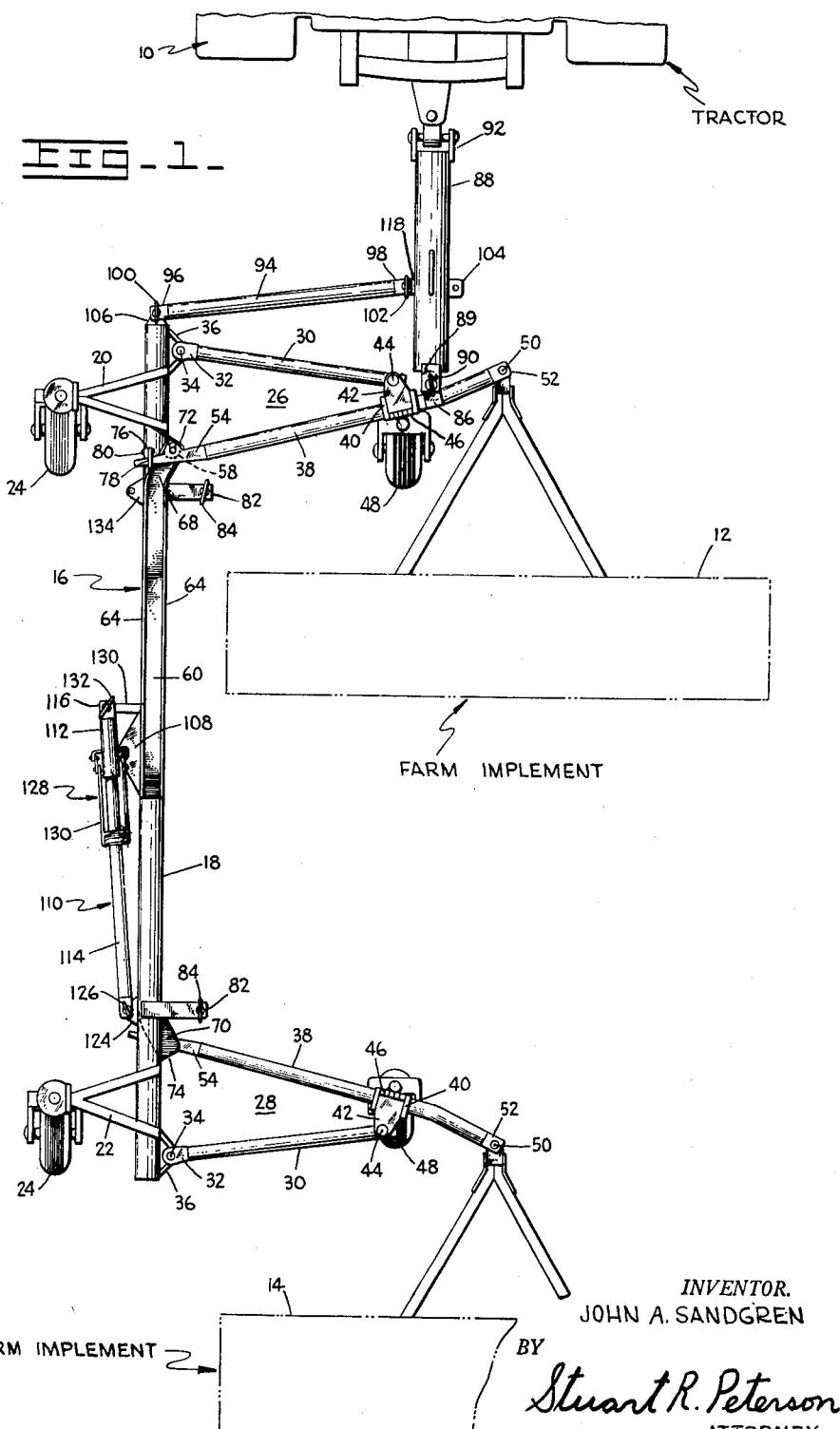
Figure 1 is a plan view showing my draft hitch connected for tandem or transport operation.

It is believed that my invention will be best understood by first referring to the hitch in its tandem or transport relation. Accordingly, attention is now directed to Figure 1 in which a tractor 10 has been fragmentarily depicted. The tractor constitutes the towing vehicle for a pair of farm implements 12 and 14, only a portion of the last-mentioned implement being illustrated. It will be immediately recognized that the constructural details of these implements has not been set forth. Actually, the particular farm implements are unimportant to an understanding of the invention, but it can be explained that the implements 12, 14 might be a pair of cultivators, grain drills, or the like.

The hitch structure exemplifying the instant invention has been generally designated by the reference numeral 16. The hitch 16 comprises an elongated frame member 18 which assumes a position parallel to the direction of tow when the implements 12, 14 are in their tandem position as set forth in Figure 1 which is now being referred to.

Projecting laterally from the frame member 18 is a pair of longitudinally spaced crowfoot wheel supports 20, 22. Each wheel support is provided with a swivel-type wheel 24. Owing to the swivel support of each wheel 24, it will be appreciated that these two wheels will orient themselves in the direction that the hitch 16 is being pulled by the tractor 10.

Next to be referred to is a pair of respective wing means 26, 28 which project laterally from the other side of the frame member 18. Each wing means 26, 28 includes a first arm 30 having a clevis 32 at one end which by way of a pin 34 is pivotally connected to a bracket 36, the bracket being fixedly secured to the frame member 18. Each wing means 26, 28 further includes a second arm 38 carrying intermediate its ends a bracket unit 40, the bracket unit in each instance having a clevis 42 for pivotal connection to the first arm, respectively, via a pin 44. Each bracket unit 40 also has a hinged journal block 46 which supports an auxiliary swivel-type wheel 48. As can be seen in Figures 2–4, the wheels 48 are so supported that they can be rotated into an upwardly directed position when not needed. The ends of each second arm 38 carries a pin 50 for engagement with a clevis 52 on the frame of each implement 12, 14. Integral with the opposite end of each second arm 38 is a projecting strip 54 supporting at its distal end a right angularly extending dog 56. The dog 56 in each instance journals a roller 58. For a purpose presently to be made manifest, it will be observed, especially from Figure 3, that the arm 38 forming a part of the wing means 26 is offset upwardly intermediate its ends, whereas the arm 38 forming a part of the wing means 28 is offset downwardly.

Extending along the right hand portion of the upper side of the frame member 18 (see Figures 2 and 3) is a track 60. Although not readily discernible, a similar track 62 extends along the underside of the frame member 18 at the left thereof (see Figures 3 and 4). A pair of vertical strips or flanges 64 constitute the upper track 60, and a similar pair of strips 66 constitute the lower track. From Figure 4 it can be seen that the tracks 60, 62 are of channel-shaped configuration. If desired, the remote end of the tracks 60, 62 may be slightly curved in the direction of the implements 12, 14, and these curved ends have been denoted in Figures 1 and 2 by the reference numerals 68, 70, respectively. Also, it is to be observed that each end 68, 70 is closed by means of end strips 72, 74, these end strips serving as limit stops for the previously mentioned rollers 58. Adjacent each track end 68, 70 is a vertically disposed plate 76. A hook-shaped latch 78 is pivotally mounted on each plate 76 via a pivot pin 80. Consequently, when the strips 54 pass under the respective latches 78, each latch 78 will assure that the strips received thereunder will remain in a locked condition until manually released.

While not used when the hitch is arranged for transporting the farm implements 12, 14 which is the situation in Figure 1, nonetheless at this time mention will be made of a pair of spaced clevises 82. By means of a removable pin 84 associated with each clevis 72, the respective wing means 26 and 28 may be retained in their folded relationship.

Still another clevis 86 is located near the free end of the arm 38 that is a part of the forward wing means 26. The role played by this particular clevis will be explained in the next paragraph. A main drawbar 88 has an ear 89 which is apertured for the acceptance of a pin 90. By reason of the pin 90 the main drawbar 88 can be attached to the clevis 86 for the purpose of pulling the hitch 16 when arranged for pulling the implements 12, 14 in their tandem relationship. The other end labeled 92 of the drawbar 88 is designed for connection to the tractor 10 in a conventional fashion.

A stabilizing drawbar 94 equipped with a clevis 96 at one end and a second clevis 98 at the other end acts as a brace for the main drawbar 88. In this regard it will be seen that a pair of pins 100 and 102 are utilized, the pin 100 extending through the clevis 96 and a lateral ear 104 on the main drawbar 88 and the pin 102 extending through the clevis 98 and a forwardly projecting ear 106 on the end of the frame member 18.

Here again the part to be referred to is not employed when the implements 12 and 14 are towed in their tandom relationship. This part is a centrally mounted clevis 108 situated on the frame member 18. The previously mentioned pin 90 is utilized in effecting connection of the main drawbar 88 to this clevis 108 when an abreast towing of the implements is desired.

Having mentioned the central clevis 108, attention is to be shifted at this point to Figure 2 where a second stabilizing drawbar 110 appears. This stabilizing bar includes a pair of telescoping elements 112 and 114. A clevis 116 on the element 112 permits its connection to a lateral ear 118 integral with the main drawbar 88 through the medium of a removable pin 120. A similar clevis 122 on the element 114 is designed to receive an integral ear 124 fixedly mounted on the frame member 18, a pin 126 in this instance effecting the connection. The pin 126 does not have to be removable inasmuch as it is not contemplated that the second stabilizing bar 110 be removed. As a practical matter, some difficulty would be involved in disengaging the pin 120 were it not for the use of an overcenter tightening device 128. An actuating lever handle 130 associated with the device 128 permits the telescoping elements 112, 114 to be moved into a relative position such that the pin 120 can be readily withdrawn when it is necessary to switch the main drawbar 88 from the position in which it appears in Figure 2 to that in which it appears in Figure 1. As herein mentioned, it is not planned that the second stabilizing bar 110 be removed, but instead it is intended that it merely be swung into a substantially parallel relationship with the frame member 18. To prevent the bar 110 from unwanted swinging when it is not performing its function, thereby retaining it in said substantially parallel relationship, an ear 130 is located in a proximal position with respect to the aforementioned clevis 108, a pin 132 engageable with said ear 130 serving as the retaining means. An ear 134 on the frame member 18 corresponds in function with the ear 124, the ear 134 acting to pivotally anchor the previously mentioned stabilizing bar 94 to said frame member 18 when the hitch is arranged as it appears in Figure 2. The pin 102 is utilized under these circumstances and extends through the clevis 98 to effect the connection of the bar 94 for the abreast towing of the implements 12, 14.

It is within the purview of the invention to provide a hitch capable of accommodating implements of various sizes. To release this aim, it is planned that certain of the members be made adjustable by means of telescoping parts or sliding mounts. Although not illustrated, it is intended that the arms 30 and 38 be comprised of telescoping elements, as far as both wings 26, 28 are concerned. Actually, the arm 38 would have adjustments on both sides of the bracket unit 40. The supports 20, 22, the brackets 36 and the clevises 82 would all have an adjustable sliding action both inwardly and outwardly with respect to the hitch pin 90. Consequently, the foregoing adjustments make it possible to have one basic hitch that may be used with implements varying from 10 to 14½ feet in width.

Having in mind the construction and arrangement of the principal elements thereof, it is believed that a complete understanding of my invention may now be had from a description of the operation. In this regard, it will first be assumed that the hitch 16 is in the position shown in Figure 1 and that it is designed to go from this tandem or transport relation to the abreast or field relationship depicted in Figure 2. First, the tractor operator will disengage the second stabilizing drawbar 110 from the ear 118 by simply removing the pin from the clevis 116. This end of the bar 110 can then be laid upon the ground. It will be observed that the overcenter device 128 enables the quick release of this second stabilizing bar 110. After doing this, the operator proceeds to disengage the first stabilizing bar 94 by removing the pins 110 and 102. This stabilizing bar 94 is then manually carried from the position in which it appears in Figure 1 to the position it appears in Figure 2. The pin 102 of course effects connection of one end of the bar 94 to the frame member 18. Before effecting connection of the other end of this first stabilizing bar 94 the operator proceeds to disengage the main drawbar 88 from the tractor and also from the arm 38 of the forward wing means 26. As far as disengaging the main drawbar 88 from the forward arm 38, he need only remove the pin 90. After detachment of the main drawbar 88, the operator carries it from the position in which it is presented in Figure 1 to the position it is to assume in Figure 2. Connection is then made of the main drawbar 88 through the clevis 108 on the frame member 18 through the agency of the same pin 90 as was used in Figure 1. Having done this, he then connects the first stabilizing drawbar 94 to the main drawbar 88 by inserting the pin 90 through the clevis 108 and the ear 89 which is integral with this main drawbar 88. Next in the course of proceedings he connects the second stabilizing drawbar 110 to the main drawbar 88 by inserting the pin 120 through the clevis 116 and ear 118. Tightening of the device 128 completes the transfer of the main drawbar 88 and the first stabilizing drawbar 94 from Figure 1 to Figure 2. These elements are now connected as they are illustrated in Figure 2.

Having accomplished the foregoing, the operator drives the tractor from the position in which it has been pictured in Figure 1 around until it is in alignment with the main drawbar 88 as it is depicted in Figure 2. He then proceeds to recouple the tractor 10 to the end 92 of the main drawbar 88 preparatory to pulling the implements 12, 14 into their abreast or field relationship. When the tractor 10 is then moved ahead a sufficient distance, the implements 12, 14 follow such a movement and concurrently therewith orient themselves in a relationship generally perpendicular to the direction of tow. During this happening, however, the wing means 26 and 28 remain extended.

If the operator has not already done so, he at this time removes the pins 84 from the respective clevises 82 preparatory to a backing up of the tractor and a folding of the wing means 26 and 28. Reverse movement of the tractor 10 then causes the wing means 26, 28 to be folded. More specifically what transpires during this interval is that the arm 30 of each wing means 26, 28 pivot into a substantially parallel relationship with the frame member 18. Concurrently with this happening is the pivoting of the arms 38 into what is also a substantially parallel relationship with said frame member 18. As has already been stated, the rollers 58 are constrained to follow in their respective tracks 60 and 62. The end result is that the wing means 26 and 28 become folded as they are pictured in Figure 2. It will of course be appreciated that the pivotal latches 78 are first manually disengaged from the strips 54 which permit the rollers 58 to travel from the curved ends 68 and 70 of the two tracks 62 and 64. The folded relationship of the wing means 26 and 28 is assured by replacement of the pins 84 in their respective clevises 82. This condition is perhaps best seen from Figure 3.

This completes the conversion from the tandem or transport condition to the abreast or field condition. All that the operator has to do now is to drive the tractor forwardly and the implements 12 and 14 will remain in their abreast relationship.

While the change from the abreast or field relationship pictured in Figure 2 back to the tandem or transport relationship depicted in Figure 1 is believed readily apparent from the information that has been given, nonetheless a brief description of the manipulations to achieve this goal will be presented at this time. The first thing that the operator needs to do is to again remove the pins 84 that the wing means 26 and 28 will automatically extend themselves when the tractor is driven forwardly, for the drag of the implements 12 and 14 will assure this happening. Next the operator actuates the tightening device 128 by raising the handle 130. This frees the stabilizing drawbar 110 so that the pin 120 can be removed from the ear 118 on the main drawbar 88. After this the operator removes both pins 100, 102 from the stabilizing drawbar 88 and carries this bar 94 around to the position in which it appears in Figure 1. He then inserts the pin 100 in the ear 106 of the frame member 18. Having done this, he uncouples the main drawbar 88 from the tractor 10 and then detaches the main drawbar from the frame member 18 by removal of the pin 90 and proceeds to carry the main drawbar around into the position it is pictured in Figure 1. Reinserting of the pin 90 into the clevis 86 and the insertion of the pin 102 through the clevis 98 of the stabilizing bar 94 and the ear 104 effects the mounting or attachment of the main drawbar 88 for towing the implements 12 and 14 in their transport relationship. As the operator walks back to his tractor, he can elevate the now detached end of the stabilizing drawbar 110 and anchor same to the ear 130 through the medium of the pin 132. Driving the tractor forwardly will then pull the implements 12 and 14 into the position in which they have been presented in Figure 1. The rollers 58 of course traverse the tracks 60 and 62 during this happening, and upon reaching the curved ends 68 and 70 the pivotal latches automatically engage the strips 54 on the ends of the arms 38 belonging to the wing means 26 and 28.

It should be noted that during the foregoing cycle the wings 26, 28 are not only extended but also that the implement hitch pins 50 are both moved outwardly with respect to the central draw pin 90. This has the desired effect of increasing the clearance between the implements so that they will not collide during the initial stages of movement from their field position toward their transport position. This future becomes important when it is realized that the field position may be of the order of only six inches compared to, say, two and one-half feet when preparing for transport.

By way of summary, it will be perceived that the frame member 18 occupies a parallel relationship with the direction of tow when the implements 12 and 14 are being pulled in their tandem or transport relationship. On the other hand, when the implements 12 and 14 are towed in their abreast or field relationship, then the frame member 18 assumes a position that is transverse or perpendicular to the direction of movement. In the position that the frame member 18 assumes in Figure 1, it will be noted that it is offset to one side of the implements 12 and 14. There is never interference between the implements or any part of the hitch 16 when making turns during the transport of the implements from one place to another. Likewise, there is never any interference between the implements or with the hitch 16 when the implements are in their abreast or field relationship. In this latter situation, the implements are maintained at the same distance interval behind the tractor 10 and turns are also easily accomplished when the implements are towed in this particular position. Stated somewhat differently, the maneuverability is not adversely affected when using a hitch constructed in accordance with the teachings of the present invention.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A draft hitch for towing a pair of farm implements in an abreast or tandem relation comprising an elongated frame member for determining the relative spacing of the implements in their abreast and tandem positions, said frame member assuming a transverse relation with respect to the towing direction when said implements are in their abreast position and assuming a parallel relation to the direction of tow when said implements are in their tandem position, a pair of spaced foldable wing means carried by said frame member, means on each wing means near the free end thereof for respective pivotal connection to said implements, means maintaining said wing means folded when said implements are in their abreast position, means intermediate the ends of said frame member for connection to a vehicle for towing said implements in said abreast position, means maintaining said wing means in an extended relation to one side of said frame member when said implements are in their tandem position, and means near the free end of one wing means for connection to the vehicle for towing said implements in their tandem position.

2. A draft hitch in accordance with claim 1 in which each wing means includes a first arm pivotally attached to one side of said frame member and a second arm pivotally attached near one end thereof to the free end of said first arm, said hitch further including a pair of tracks on the frame member for guiding the other ends of said second arms along said frame member in effecting the folding of said pair of wing means, whereby all of said arms assume a substantially parallel relation with said frame member when said implements are in their abreast position.

3. A draft hitch in accordance with claim 2 in which one of said second arms is offset upwardly and the other downwardly intermediate their respective points of attachment to said first arms and their said other ends, the track for guiding said one second arm being situated on the upper side of said frame member and the track for guiding said other second arm being on the under side of said frame member.

4. A draft hitch in accordance with claim 3 in which each track is channel-shaped, and a roller element rotatably mounted on each other end of said second arm and received in the channel-shaped track with which its arm is associated.

5. A draft hitch in accordance with claim 2 in which said means for maintaining said wings folded includes a pair of spaced clevis units projecting from said one side of the frame member having removable pin elements engageable with said second arms to maintain the folded condition of said arms.

6. A draft hitch for towing a pair of farm implements in an abreast or tandem relation comprising an elongated frame member, a pair of spaced arms mounted on said frame member for swinging movement from a first angular position in which the free ends thereof are in a proximal relationship with said frame member to a second angular position in which their free ends are in a laterally spaced relationship with said frame member, means for pivotally connecting said implements to said free ends, means retaining said arms in said first position when said implements are to be pulled in their abreast relation, means intermediate the ends of said frame member for connection to a vehicle for towing said implements in their abreast relation, means retaining said arms in said second position when said implements are to be pulled in their tandem relation, and means adjacent the free end of one of said arms for connection to said vehicle for towing said implements in their tandem relation, whereby said frame member will assume a transverse position in front of said implements when in their abreast relation and an offset position to one side of said implements when in their tandem relation.

7. A draft hitch for towing a pair of farm implements in an abreast or tandem relation comprising an elongated frame member for determining the relative spacing of the implements in their abreast and tandem positions, said frame member assuming a transverse relation with respect to the towing direction when said implements are in their abreast position and assuming a parallel relation to the direction of tow when said implements are in their tandem position, a main drawbar, means for attaching said main drawbar to an intermediate portion of said frame member so as to project perpendicularly from one side thereof when said implements are to be pulled in their abreast position, a pair of spaced foldable wing means carried by said frame member so as to project from the opposite side of said frame member when extended, means for retaining said wing means in a folded relation when said implements are to be pulled in their abreast position, means for attaching said main drawbar to the free end of one of said wing means for towing said implements in their tandem position, and means for maintaining both of said wing means in an extended relation with respect to said frame member when said implements are to be towed in said tandem position.

8. A draft hitch for towing a pair of farm implements in an abreast or tandem relation comprising a relatively long frame member for determining the relative spacing of the implements in their abreast and tandem positions, said frame member assuming a transverse relation with respect to the towing direction when said implements are in their abreast position and assuming a parallel relation to the direction of tow when said implements are in their tandem position, a swing-type wheel adjacent each end of said frame member, a main drawbar, means for attaching one end of said main drawbar to an intermediate portion of said frame member, a stabilizer drawbar, means spaced to one side of said first-mentioned attaching means for attaching one end of said stabilizer drawbar to said frame member, means for attaching the other end of said stabilizer drawbar to said main drawbar to maintain said transverse relation of said frame member, a pair of first arm elements pivotally connected at one end to said frame member at spaced locations thereon, a pair of second arm elements pivotally connected intermediate their ends to the projecting ends of said first arm elements, track means on said frame member constraining one end of each of said second arm elements for sliding movement therealong, said track means guiding said pairs of arm elements from a folded position to an extended position, respective means on said frame member for selectively retaining said arm elements in said folded position, means on the other ends of said second arm elements adapted to be connected to the implements to be towed, means on the said other end of one of said second arm elements for attaching said one end of said main drawbar thereto, and means on the end of said frame member adjacent the pivotal connection of the first arm element which is associated with said one second arm element for attaching one end of said stabilizer drawbar to said frame member so as to maintain said parallel relation when the other end of said stabilizer bar is attached to said main drawbar.

9. A draft hitch in accordance with claim 8 including a second stabilizer drawbar, means spaced to the other side of said first-mentioned attaching means for attaching one end of said second stabilizer drawbar to said frame member, and means for attaching the other end of said second stabilizer drawbar to said main drawbar to supplement the action of said first stabilizer drawbar in maintaining said transverse relation.

10. A draft hitch in accordance with claim 9 in which said second stabilizer drawbar includes a pair of telescopically received elements and means for manipulating said elements to effect detachment of said second stabilizer drawbar from said main drawbar.

11. A draft hitch in accordance with claim 10 including a pair of latches pivotally mounted on said frame member for engaging said second arm elements for retaining said pairs of arm elements in their extended position.

References Cited in the file of this patent

UNITED STATES PATENTS

| | | |
|---|---|---|
| 1,815,330 | Robinson | July 21, 1931 |
| 1,963,426 | Taylor | June 19, 1934 |
| 2,226,586 | Seaholm | Dec. 31, 1940 |
| 2,658,770 | Koenig | Nov. 10, 1953 |